United States Patent [19]

Armstrong et al.

[11] Patent Number: 5,794,722

[45] Date of Patent: Aug. 18, 1998

[54] GUMBO REMOVAL

[75] Inventors: James E. Armstrong, Crosby, Tex.; Barney J. Hayes, Ventura, Calif.

[73] Assignee: Sundowner Offshore Services, Inc., Houston, Tex.

[21] Appl. No.: 703,208

[22] Filed: Aug. 26, 1996

[51] Int. Cl.⁶ .................................................. G21B 21/06
[52] U.S. Cl. ............................ 175/66; 175/207; 166/234
[58] Field of Search ............................. 175/65, 66, 207; 166/227, 234

[56] References Cited

U.S. PATENT DOCUMENTS

| | | | |
|---|---|---|---|
| 2,049,336 | 7/1936 | Stine | 166/234 |
| 3,039,545 | 6/1962 | Rogers | 175/66 |
| 3,774,702 | 11/1973 | Elenburg | 175/66 |
| 3,880,762 | 4/1975 | Wise | 210/460 |
| 3,963,605 | 6/1976 | Seabourn | 209/2 |
| 4,116,288 | 9/1978 | Love | 175/66 |
| 4,599,172 | 7/1986 | Gardes | 166/234 X |
| 4,882,034 | 11/1989 | Derrick et al. | 210/389 |

*Primary Examiner*—Roger J. Schoeppel
*Attorney, Agent, or Firm*—Baker & Botts, L.L.P.

[57] ABSTRACT

The invention features an assembly for use in a system used to drill a well. The system is capable of receiving a mixture of drilling fluid (e.g., liquid mud) and gumbo from downhole of the well. The assembly has a grating having at least one opening extending through the grating and positioned to intercept the mixture. The at least one opening is sized to block the gumbo from passing through the at least one opening and to allow the fluid to pass through the at least one opening. The assembly has an arm and a motivator connected to move the arm across the grating to remove the gumbo blocked from passing through the at least one opening.

9 Claims, 4 Drawing Sheets

1
GUMBO REMOVAL

Background of the Invention

The invention relates to removing gumbo.

Drilling a well (e.g., an oil well) typically involves circulating a drilling fluid (e.g., liquid mud) between the surface of the well and the bottom of the well bore. The drilling fluid serves as a medium to remove products of the drilling (e.g., removed earth and drill shavings) from the well bore. As shown in FIGS. 1–2, the drilling fluid may be injected into a hollow center of a drill string 104 (used to actuate a drill bit located at the bottom of the well bore) extending from the surface of the well to the bottom of the well bore. The drilling fluid combines with the products of the drilling and returns to the surface via an annular space 101 between the outer surface of the drill string 104 and the inner surface of a well casing 102 which encases the drill string 104.

When the drilling fluid returns to the surface, the fluid is typically filtered to remove the products of the drilling. Drill shavings and mineral deposits may be removed via devices known as shakers; however, before the drilling fluid is passed through the shakers, a substance known as gumbo (a product of the drilling) is typically removed from the drilling fluid. Gumbo is a silty, sticky soil present near the well bore that accumulates and eventually impedes operation of the fluid circulation system if not removed. For purposes of removing the gumbo, the drilling fluid returning from downhole may be passed over an inclined grating 100 which extends downwardly from a top opening 103 of the well casing 102 to one opening of a gumbo disposal pipe 106. One opening of a pipe 108 that extends to the shakers is located below the grating 100. The gumbo cannot pass through the grating 100. Therefore, the gumbo rolls down the incline of the grating 100 and exits through the gumbo disposal pipe 106. The remainder of the drilling fluid returning from downhole passes through the grating 100, exits through the pipe 108, and is further filtered by the shakers before being reinjected into the hollow center of the drill string 104.

SUMMARY OF THE INVENTION

In general, in one aspect, the invention features an assembly for use in a system used to drill a well. The system is capable of receiving a mixture of drilling fluid (e.q., liquid mud) and gumbo from downhole of the well. The assembly includes a grating having at least one opening extending through the grating and positioned to intercept the mixture. The at least one opening is sized to block the gumbo from passing through the at least one opening and to allow the fluid to pass through the at least one opening. The assembly also includes an arm and a motivator connected to move the arm across the grating to remove the gumbo blocked from passing through the at least one opening.

Implementations of the invention may include one or more of the following. The grating may have a second opening extending through the grating, the second opening sized to allow gumbo to pass through the second opening, and the motivator may be connected to move the arm across the at least one opening toward the second opening. The grating may have concentric rings. The grating may include bars spaced apart by a predetermined distance, and the arm may include teeth for extending between the bars.

In general, in another aspect, the invention features a method for use in a system used to drill a well, the system capable of receiving a mixture of drilling fluid and gumbo from downhole of the well. The method includes passing the mixture through a grating to remove the gumbo from the mixture and continuously scraping the grating to remove gumbo deposited on the grating from the step of passing.

In general, in another aspect, the invention features an assembly for use in a system used to drill a well, the system capable of receiving a mixture of drilling fluid and gumbo from a well casing of the well. The assembly has a grating having bars surrounding the casing and positioned to intercept the mixture. The spacing between adjacent bars near where the bars intercept the mixture blocks the gumbo from passing between adjacent bars and allows the fluid to pass through adjacent bars. The grating has an opening away from where the bars intercept the mixture which allows the gumbo to pass through the opening. The assembly also has an arm positioned near the grating and having teeth which extend between adjacent bars, and a motivator is connected to move the arm across the grating to move the gumbo blocked from passing through adjacent bars toward the opening.

Among the advantages of the invention are one or more of the following. Gumbo present on the grating is removed without halting drilling operations. Inadvertent loss of drilling fluid is minimized.

Other advantages and features will become apparent from the following description and from the claims.

Description of the Preferred Embodiments

Figure 1:
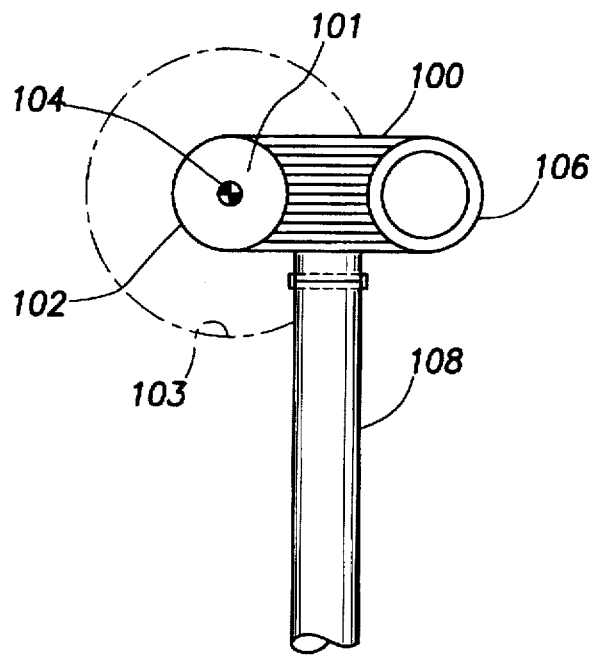
FIG. 1 is a top plan view of a prior art gumbo removal system.
Figure 2:
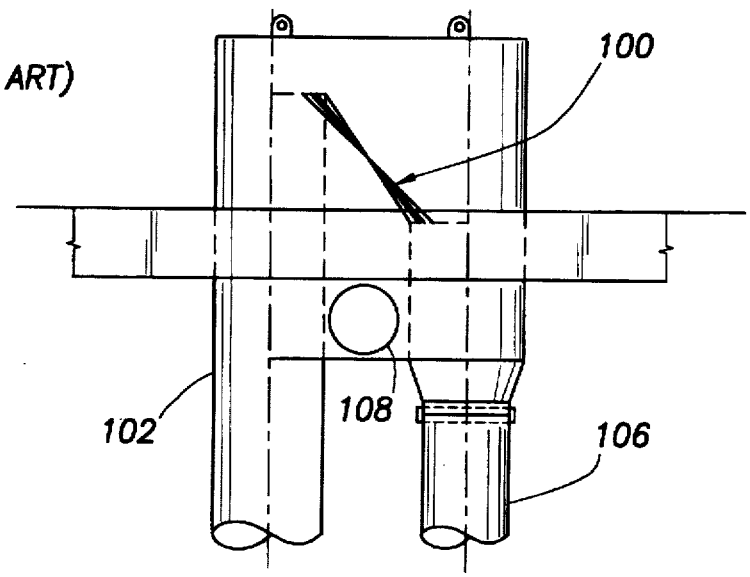
FIG. 2 is a side plan view of the gumbo removal system of FIG. 1.
Figure 4:
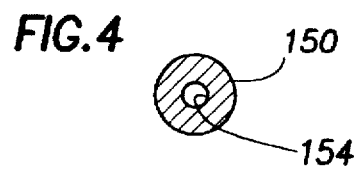
FIG. 4 is a cross-sectional view of the drill string taken along line 4—4 of FIG. 3.
Figure 3:
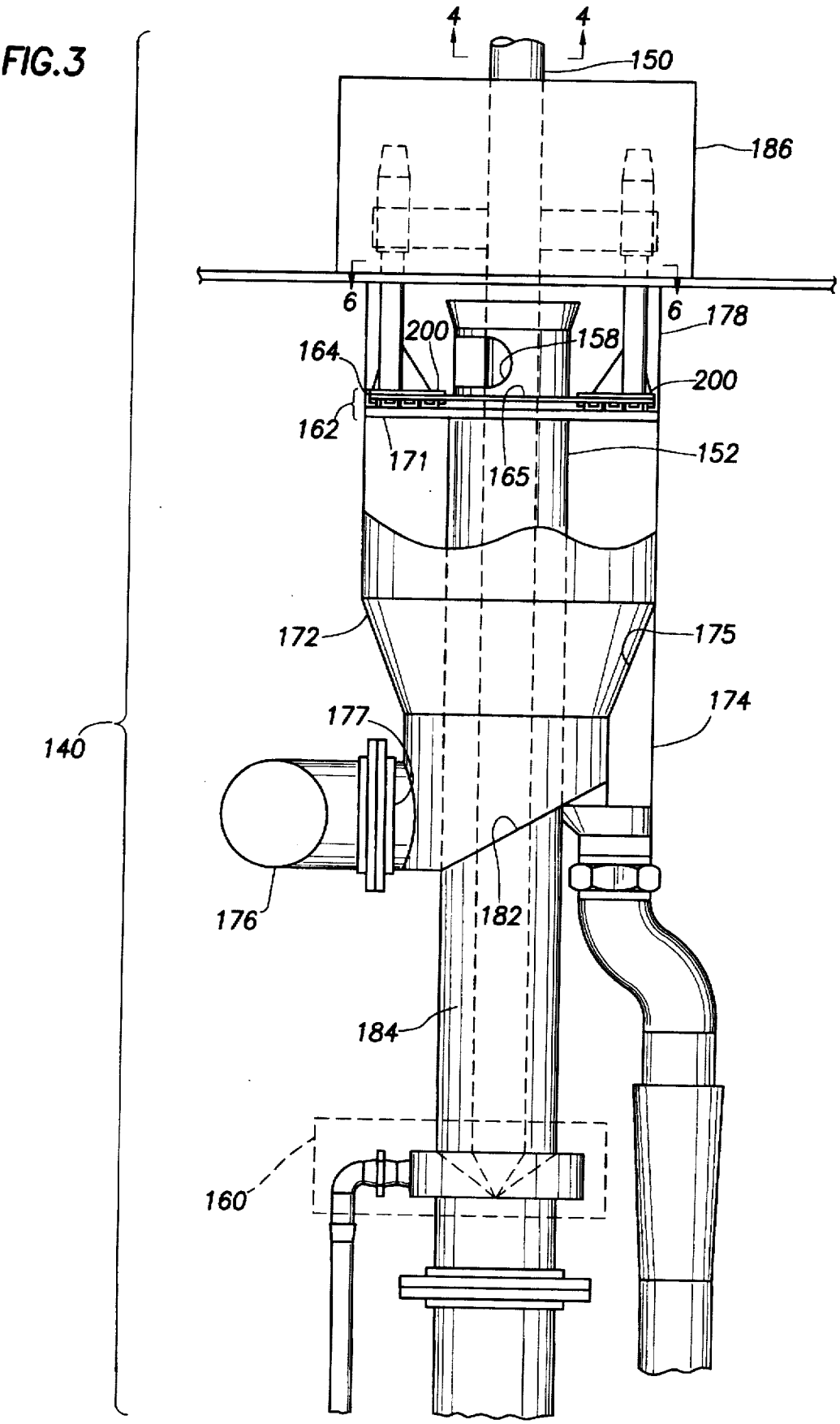
FIG. 3 is a side plan view of a gumbo removal system according to the invention.

As shown in FIGS. 3 and 4, in a system 140 for drilling a well, a tubular well casing 152 extends downwardly to the bottom of a well bore (not shown). The well casing 152 encases a drill string 150 which extends toward the bottom of the well bore (to actuate a drill bit) and is coaxially aligned with the casing 152. The drill string 150 has a hollow center 154 used to pass a pressurized drilling fluid (e.g., liquid mud) from the surface of the well to the bottom of the well bore. The drilling fluid washes loose particles (e.g., drill shavings) and earth (e.g., gumbo) from the bottom of the well bore to form an unfiltered drill fluid mixture. This mixture returns to the surface via an annular space 184 formed between the exterior surface of the drill string 150 and the interior surface of the well casing 152. While traveling along the annular space 184, the mixture passes through a gumbo buster 160. The gumbo buster 160 reduces the size of gumbo particles present in the mixture.

Figure 8:
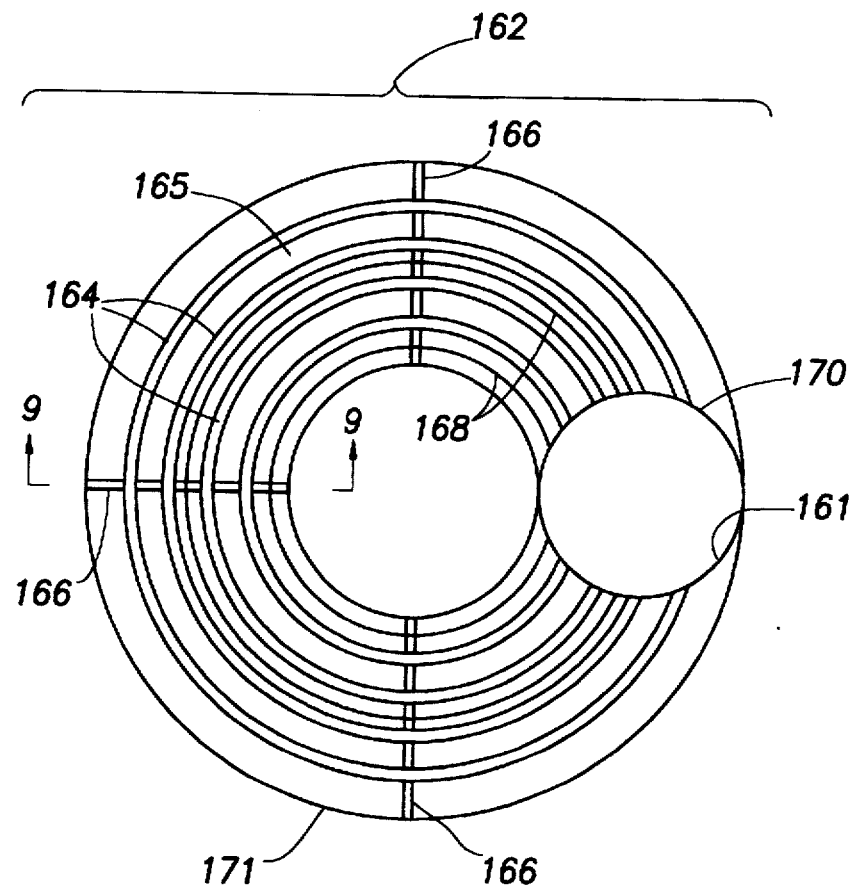
FIG. 8 is a top plan view of the grating.

For purposes of removing the gumbo from the mixture, the top of the well casing 152 extends upwardly into a bottom opening 182 of a housing 172 which surrounds the top of the casing 152. Near the top of the casing 152, the housing 172 is coaxial with the casing 152 and is generally cylindrical. As shown in FIG. 8, near the top of the well casing 152, an opening 158 in the sidewall of the casing 152 allows the mixture to spill out of the space 184 and onto a substantially flat, annular grating 162 located below the opening 158. The opening 158 extends approximately 180° around the sidewall of the casing 152. The grating 162 radially extends from the exterior surface of the casing 152 to the interior surface of the housing 172 where the grating 162 is secured. Openings formed in the grating 162 beneath the opening 158 block gumbo in the mixture from passing through the grating 162 while permitting the remaining mixture to pass through the grating 162 and exit a bottom opening 177 of the housing 172. A pipe 176 fitted to the opening 177 carries the mixture that passed though the grating 162 to shakers (not shown) which filter fine particles (e.g., mineral deposits) from the mixture to recover the drilling fluid. To continue the recirculation of the drilling fluid, the drilling fluid is reinjected into the hollow center 150 of the drill string 150.

For purposes of removing the gumbo from the grating 162, the grating 162 has a circular opening 161 sized to allow the gumbo to pass through the grating 162 and into a gumbo disposal pipe 174 positioned to receive gumbo passing through the opening 161. The pipe 174 extends downwardly from the opening 161 though an opening 175 of the housing 172. For purposes of preventing drilling fluid from flowing through the opening 161 (and therefore, not being recoverable), the opening 161 is located in a region of the grating 162 diametrically opposed to the region of the grating 162 that intercepts the mixture expelled from the opening 158.

In order to move the gumbo trapped on the grating 162 toward the opening 161, a motivator 186 (e.g., a motor or a rotary table) continuously rotates a rake 178 about the axis of the casing 152. The rake 178 has diametrically opposed arms 200 (FIG. 6) which are positioned near the upper surface 165 of the grating 162 and used to move gumbo trapped on the surface 165 toward the opening 161. Each of the arms 200 is in a plane substantially parallel to the upper surface 165 of the grating 162 and radially extends from the exterior surface of the casing 152 to the interior surface of the housing 172.

Figure 9:
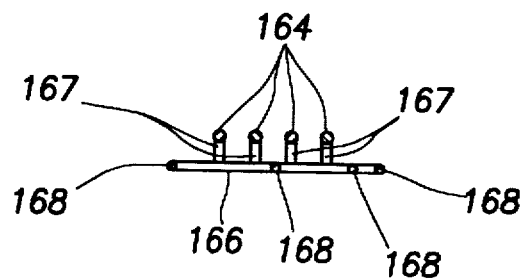
FIG. 9 is a cross-sectional view of the grating taken along line 9—9 of FIG. 8.

The grating 162 includes four planar, concentric rings 164, of differing diameters, that are coaxial with the casing 152 and in which is formed the opening 161. The radial spacing between adjacent rings 164 blocks the gumbo from passing though the grating 162 near where the mixture is expelled through the opening 158. For purposes of supporting the rings 164, the grating 162 has a support structure 171 which permits downwardly extending teeth 202 (FIG. 7) of the rake 178 to pass between the rings 164 to scrape gumbo, as further described below. The support structure 171 includes four planar, concentric rings 168 with diameters ranging from the diameter of the exterior surface of the well casing 152 to the interior diameter of the housing 152. The rings 168 are all coaxial with the casing 152. The rings 168 are connected via three bars 166 which extend radially from the exterior of the casing 152 to the interior of the housing 172. A ring 170, located in the same plane as the rings 168, intercepts the rings 168 and encircles the opening 161. Upwardly extending from the rings 168 and the ring 170 are posts 167 (FIG. 9) connecting the rings 168 to the bars 166. The posts 167 are of a sufficient height to allow the teeth 202 to pass between the rings 164 and above the rings 168.

Figure 5:
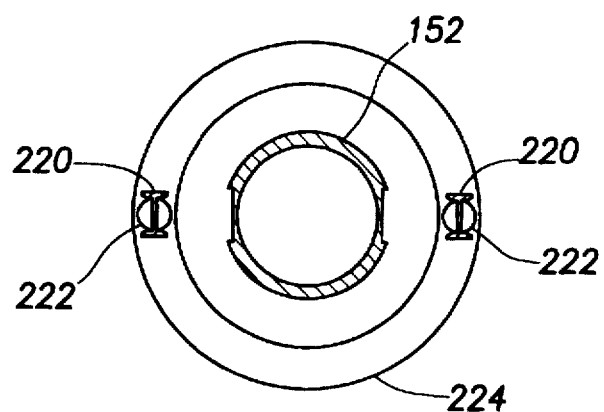
FIG. 5 is a top plan view of the rake.
Figure 6:
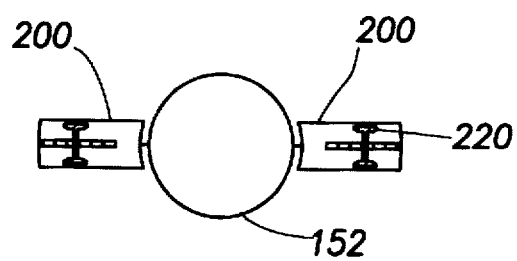
FIG. 6 is a cross-sectional view of the rake taken along line 6—6 of FIG. 3.
Figure 7:
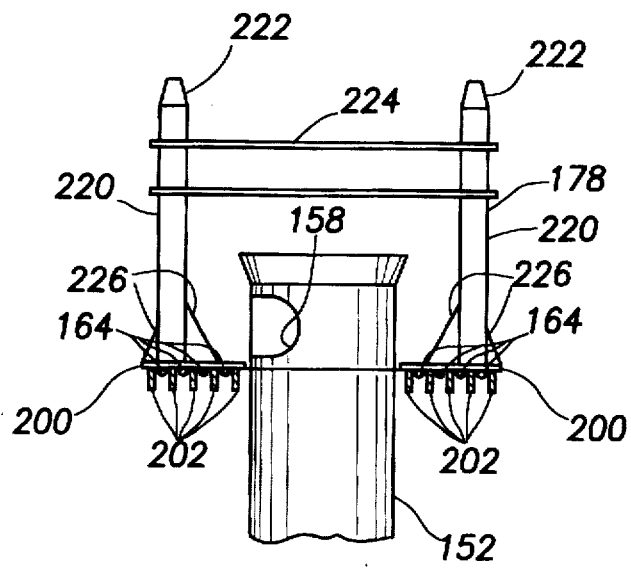
FIG. 7 is a side plan view of the rake.

As shown in FIGS. 5–7, the rake 178 includes five teeth 220 on each arm 200 that extend downwardly from the arm 200 between adjacent bars 164 of the grating 162. Extending upwardly from each arm 200 is an I-beam 220. Supporting each I-beam 220 are two angular braces 226 extending from the I-beam 220 to the arm 200. The I-beams 220 are used to couple the arms 200 to the motivator 186 via couplers 222 that attached to the top of the I-beams 220. A support ring 224, located above the top of the casing 152 and coaxial with the casing 152, secures the two I-beams 220 together and allows the drill string 150 to extend therethrough.

Other embodiments are within the scope of the following claims.

What is claimed is:

1. An assembly for use in a system used to drill a well, the system capable of receiving a mixture of drilling fluid and gumbo from downhole of the well, the assembly comprising:

a grating having at least one opening extending through the grating and positioned to intercept the mixture, said at least one opening sized to block the gumbo from passing through said at least one opening and to allow the fluid to pass through said at least one opening;

an arm; and a motivator connected to move the arm across the grating to remove the gumbo blocked from passing through said at least one opening.

2. The assembly of claim 1, wherein the grating has a second opening extending through the grating, the second opening sized to allow gumbo to pass through the second opening, and wherein the motivator is connected to move the arm across said at least one opening toward the second opening.

3. The assembly of claim 1, wherein the grating comprises concentric rings.

4. The assembly of claim 1, wherein the grating includes bars spaced apart by a predetermined distance, and wherein the arm includes teeth for extending between the bars.

5. The assembly of claim 1, wherein the motivator comprises a motor.

6. The assembly of claim 1, wherein the motivator comprises a rotary table.

7. A method for use in a system used to drill a well, the system capable of receiving a mixture of drilling fluid and gumbo from downhole of the well, the method comprising:

passing the mixture through a grating to remove the gumbo from the mixture, said grating having at least one opening extending through the grating and positioned to intercept the mixture, said at least one opening sized to block the gumbo from passing through said at least one opening and to allow the fluid to pass through said at least one opening;

continuously scraping the grating to remove gumbo deposited on the grating from the step of passing.

8. The method of claim 7, further comprising removing the gumbo that is scraped from the grating.

9. An assembly for use in a system used to drill a well, the system capable of receiving a mixture of drilling fluid and gumbo from a well casing of the well, the assembly comprising:

a grating having bars surrounding the casing and positioned to intercept the mixture, wherein spacing between adjacent bars near where the bars intercept the mixture blocks the gumbo from passing between the adjacent bars and allows the fluid to pass through the adjacent bars, and wherein the grating has an opening away from where the bars intercept the mixture which allows the gumbo to pass through the opening;

an arm positioned near the grating and having teeth which extend between the adjacent bars; and a motivator connected to move the arm across the grating to move the gumbo blocked from passing through the adjacent bars toward the opening.

* * * * *